United States Patent [19]

Pohlenz

[11] 4,237,360
[45] Dec. 2, 1980

[54] INDUCTION HEAT SEALING

[75] Inventor: Elmer E. Pohlenz, Richmond, Ind.

[73] Assignee: Aluminum Company of America, Pittsburgh, Pa.

[21] Appl. No.: 958,055

[22] Filed: Nov. 6, 1978

[51] Int. Cl.³ .......................... H05B 6/10; B65B 7/28
[52] U.S. Cl. .......................... 219/10.41; 219/10.71; 219/10.53; 219/10.79; 156/69; 156/274; 156/380; 53/329
[58] Field of Search ............. 219/10.69, 10.71, 10.73, 219/10.75, 10.79, 10.49 R, 10.53, 10.41, 10.43; 156/272, 273, 274, 380, 69; 53/329

[56] References Cited

U.S. PATENT DOCUMENTS

| | | | |
|---|---|---|---|
| 2,456,962 | 12/1948 | Lee | 219/10.69 |
| 3,508,993 | 4/1970 | Belcher et al. | 156/274 |
| 3,517,476 | 6/1970 | Bowen | 53/329 X |
| 3,694,609 | 9/1972 | Kennedy | 219/10.79 |
| 3,706,176 | 12/1972 | Leatherman | 219/10.53 |
| 3,723,212 | 3/1973 | Casper | 156/380 X |
| 3,748,422 | 7/1973 | Schafer | 219/10.53 |
| 3,760,561 | 9/1973 | Over et al. | 53/201 |
| 3,808,074 | 4/1974 | Smith et al. | 156/69 |
| 3,831,344 | 8/1974 | Over | 53/329 |
| 3,892,351 | 7/1975 | Johnson et al. | 229/43 |
| 4,017,704 | 4/1977 | Collins et al. | 219/10.79 |
| 4,152,566 | 5/1979 | Mägerle | 219/10.53 |

Primary Examiner—Thomas J. Kozma
Assistant Examiner—Philip H. Leung
Attorney, Agent, or Firm—David W. Brownlee; Max L. Williamson

[57] ABSTRACT

A system is disclosed for sealing a metal foil membrane on the end of a container such as a composite container using a rotating turret having a plurality of spindles in it with non-metal rotating heads on the spindles for pressing a closure and foil membrane against the container sealing surface and rotating the container-closure assemblies about the axis of the container as they are moved through a magnetic field produced by an induction heating coil disposed at least partway around the turret. The container-closure assemblies may be moved through the magnetic field in less than one second to heat the sealing area of the foil membrane and metal foil liner in the container to the required sealing temperature while minimizing heating of the membrane beyond the area of sealing contact with the container. Either the foil membrane or container liner or both have a heat seal resin thereon which is softened or melted by the induced heat in the membrane and seals the membrane to the container when the container-closure assemblies are removed from the magnetic field.

7 Claims, 4 Drawing Figures

INDUCTION HEAT SEALING

BACKGROUND OF THE INVENTION

1. Field of Art

This invention relates to sealing of containers and in particular to a method of induction heat sealing foil membranes on containers.

2. Brief Description of the Prior Art

The prior art is replete with disclosures of various systems for induction heat sealing metal foil membranes on containers of various materials of construction. For example, U.S. Pat. No. 3,892,351 to Johnson et al discloses apparatus for rotating container assemblies as they are moved parallel to an induction heating coil to induction heat seal a metal foil membrane on a composite container. The composite container has a metal foil lining which is rolled outwardly into a bead at the end to which the metal foil membrane is sealed. U.S. Pat. No. 4,017,704 to Collins et al discloses another technique for induction heat sealing containers using an induction heating coil having a metal core in the center thereof for adjusting the maximum flux density of the magnetic field produced by the coil. U.S. Pat. Nos. 3,694,609; 3,748,422; 3,808,074 and 3,909,326 provide additional disclosures of methods and apparatus for induction heat sealing metal foil membranes on containers.

Despite the many prior art systems for induction heat sealing foil membranes on containers, none of the systems have gained commercial acceptance. The systems have been either unreliable, too slow or too expensive, especially for induction heat sealing composite containers. Spirally wound composite containers typically have a lap seam which results in a hump and/or crevice in the rolled edge of the container to which the foil membrane is sealed. The curved surface of the rolled edge also provides a poor sealing surface because it is relatively narrow and may have irregularities in it.

An induction heat sealing system is desired for reliable, high speed, production sealing of metal foil closures on containers.

SUMMARY OF THE INVENTION

This invention provides a method of induction heat sealing metal foil membranes on containers employing a rotatable turret with a plurality of spindles in the turret with a rotating head on each spindle for pressing a closure and foil membrane against the underlying container and for rotating the container and closure about the axis of the container as the assembly is rotated about the axis of the turret and through a magnetic field adjacent the heads. The container-closure assemblies move through the magnetic field to heat the foil portion of the membrane at the area of contact with the container while minimizing heating of the membrane beyond such area. In this way, the desired high heat for softening the bonding material is produced and dissipated very rapidly without causing wrinkling or burning of the foil membrane structure. This invention can therefore produce a reliable seal at production rates in excess of 600 containers per minute. Rotation of the container in excess of two turns in the magnetic field provides a double continuous circumferential heat application at the seal area producing better seal characteristics.

Accordingly, an object of this invention is to provide a fast reliable method for induction heat sealing metal foil membranes on containers. An advantage of this invention is that the foil membranes are sealed on the containers without wrinkling the membrane or burning the edges of the membrane. Another advantage of this invention is that it seals the foil membrane to a container regardless of irregularities in the sealing surface or the presence of a folded tab on the membrane.

Another object of this invention is to employ a rotatable turret for induction heat sealing containers in which the turret has nonmetallic rotating heads on each spindle for pressing the closure and foil membrane against the container and rotating the containers and closures as they are moved through an induced magnetic field. An advantage of this system is that the position and movement of the container-closure assembly seal area is closely controlled as it is moved through the magnetic field to permit accurate control of the heat which is induced in the foil membrane.

The above and other objects and advantages of this invention will be more fully understood and appreciated with reference to the following description and the drawings attached hereto.

DESCRIPTION OF A PREFERRED APPARATUS AND MODE OF OPERATION

Figure 1:
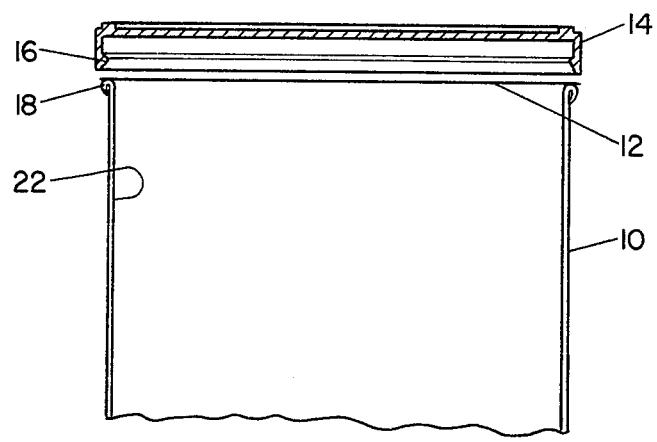
FIG. 1 is a cross-sectional view through a container, foil membrane, and closure adapted to be induction heat sealed by this method.
Figure 2:
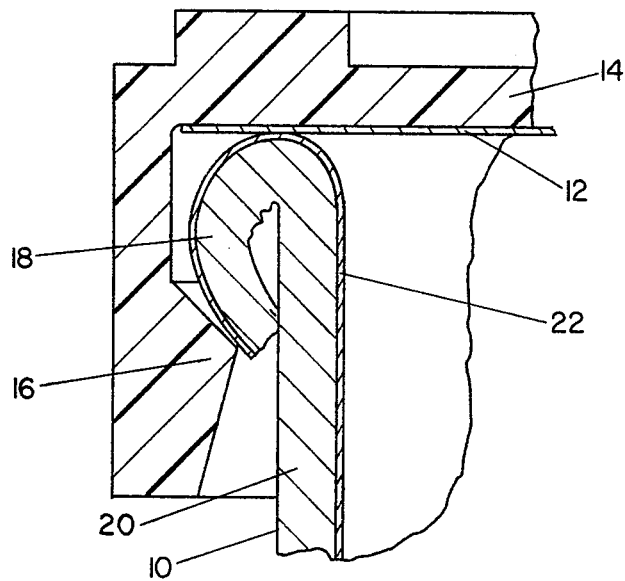
FIG. 2 is an enlarged fragmentary cross-sectional view through a top edge portion of a container-closure assembly adapted to be sealed in accordance with this invention.

Referring to FIGS. 1 and 2, an exemplary container-closure assembly adapted to be sealed in accordance with this invention is illustrated in the form of a composite container 10, a foil membrane structure 12 across the open end of the container and a plastic cap 14 over the membrane 12. An annular lip 16 on the cap 14 may be snapped under a rolled edge 18 on the container 10 to hold the cap on the container. In the practice of this invention, the membrane structure 12 is preferably first inserted in the plastic cap 14 and the assembly then positioned on the container 10 for induction sealing of the membrane to the container. FIG. 2 shows the container-closure assembly ready for heat sealing.

The composite container 10 may be a spirally wound tube construction which is cut to length and which has its top rim rolled outwardly to form a circumferentially extending bead 18 on the top of the container. The side wall of the tubular container may comprise several layers or piles including a paperboard layer 20 and a metal foil liner 22, preferably aluminum foil, coated on its inner surface with a thermoplastic material such as Surlyn, polypropylene or other materials. The top edge of the container is preferably rolled into a rim to present an upwardly facing sealing surface to which the foil membrane structure 12 may be induction heat sealed. The full thickness of the container wall may be rolled into the rim as illustrated, or alternatively, a layer of the paperboard may be stripped or skived from the end of the container prior to rolling of the rim.

Spirally wound composite containers have spiral lap seams having an extra thickness of liner material which produces a hump and accompanying crevice in the side wall and in the curled edge 18 of the container. It is this hump and crevice in the curled edge 18 which makes induction heat sealing of composite containers difficult at best.

The foil membrane 12 is preferably made of aluminum or an alloy thereof and may have a thermoplastic heat seal resin on at least the undersurface thereof which is to be sealed to the curled edge of the container. The membrane 12 may also have an integral tab, not shown, which may be folded over the top of the membrane as disclosed in U.S. Pat. No. 3,892,351, for facilitating removal of the membrane from the sealed container. Such folded tab makes induction heat sealing of the container more difficult because it produces a double layer of metal where it overlies the body of the membrane and results in nonuniform heating of the membrane. For example, U.S. Pat. No. 3,892,351 discloses that the tab may be 100° F. cooler than the remainder of the circumferential seam during induction heat sealing of the container.

As an alternate to an integral tab folded over the membrane 12, a tear strip may be defined by score lines in the foil membrane with or without a separate tab member attached to the tear strip to facilitate severance of the tear strip and membrane from a container. The use of such a tear strip will help to obviate some of the problems of nonuniform heating of the membrane where it is to be sealed to the container liner.

Figure 3:
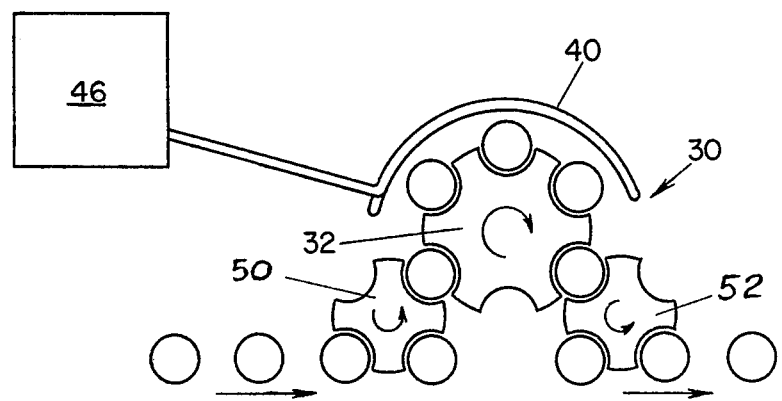
FIG. 3 is a top plan view of apparatus adapted for practice of this invention.
Figure 4:
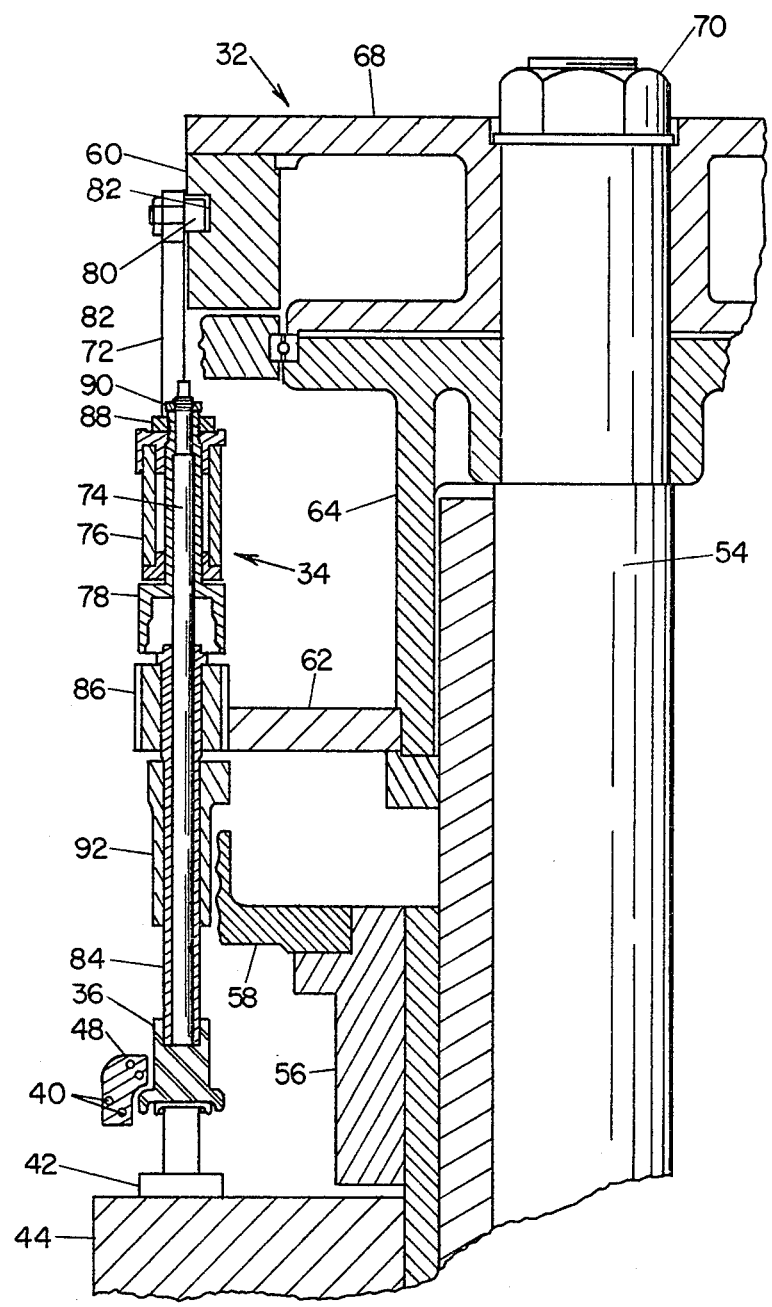
FIG. 4 is a cross-sectional view through a turret, capping head, container-closure assembly, and induction heating coil adapted for practice of this invention.

Referring to FIGS. 3 and 4, a rotary turret machine 30 is illustrated which is adapted to induction heat seal containers 10 in accordance with this invention. The machine 30 includes a turret 32 which rotates about a vertical axis and which has a plurality of spindles 34 in it with a non-metal rotating head 36 on each spindle. The turret 32 for a capping machine of this invention may include a center support column 54, a turret hub 56, a turret frame 58 with outwardly open slots in it for receiving the spindles, a cam 60, a bull gear 62, a turret support sleeve 64, an upper cam support 68 and a large nut 70. Each spindle 34 may include a support yoke 72 mounted on a shaft 74 by means of a sleeve 76 and a housing 78, with a cam follower 80 secured to the top of the yoke. Cam follower 80 is disposed in cam track 82 in upper cam 60 and follows the up and down path of the track to move yoke 72 up and down as the spindle is rotated around the turret. The sleeve 76 is supported on a housing 78 which is rigidly attached to shaft 74 with a nut 88 threaded on the end of housing 78 to secure yoke 72 thereon. Another nut 90 is threaded on the end of the shaft 74 so the vertical movement of the yoke acts on the shaft. The spindle further includes a drive sleeve 84 with a driven gear 86 secured thereto mounted on shaft 74 below the housing 78 so the sleeve 84 and gear 86 can freely rotate on shaft 74. During capping, gear 86 is continually driven by bull gear 62 to rotate drive sleeve 84 and the capping head 36 on each sleeve.

A turret of this invention is similar to the turret disclosed in U.S. Pat. No. 3,760,561 except this invention employs non-metal rotating heads 36 instead of spinning head sets on the roll-on spindles disclosed in that patent. A turret 30 of this invention may be adapted to have spinning head sets mounted on the spindles 34 so the turret may include a lower cam, spindle guide 92 and other apparatus associated therewith for operation of such spinning head sets.

Apparatus of this invention further includes an induction heating coil 40 disposed partway around the turret closely adjacent the rotating heads 36 to produce a magnetic field in the area of the heads. To permit rotation of the containers around their axes, the machine also includes a freely rotatable container support 42 in the rotating table 44 under the spindles 34 in the turret. Container support 42 is resiliently loaded to apply proper seal pressure and compensates for container height variation.

A high frequency alternating current generator 46 is provided near the turret 30 to charge the coil 40 with high frequency alternating current. The generator 46 is preferably connected to a source of water, not shown, for circulating water or other coolant through the coil. High frequency alternating current generators are available from several sources such as Lepel High Frequency Laboratories, Inc. and Induction Heating Corporation. Such generators may supply alternating current in a variety of frequencies, for example, of 350-450 kilocycles per second and a variety of power ranges depending on the application.

The induction heating coil 40 may include one or more conductor windings or turns made of copper tubing with flow of coolant through the hollow center. The windings are preferably embedded in plastic 48 as shown in FIG. 4 to electrically insulate them and to hold them secure. The windings are positioned closely adjacent the top edge of the containers 10 to be sealed above and below such edge to concentrate the magnetic field in the area to be sealed. The plastic capping head 36 which is pressed against the top of the overcap 14 is interposed between the heating coil and the metal in the container assembly which is to be heated. However, the capping head 36 is not heated since it is non-metallic and not affected by the magnetic field.

In the practice of this invention, container-closure assemblies adapted for induction heat sealing are fed seriatim into the turret by a star wheel 50 (FIG. 3) which slides the containers onto the container supports from a table or platform having an upper surface which is at least as high as the upper surface of the supports so the containers can be guided onto the supports. As the container assemblies are moved under the spindles 34, the cam track 82 moves the spindles and capping heads 36 down against the closure 14 on each container 10 to press the foil membrane 12 against the rim of the container and to rotate the container assembly. Rotation of the turret 32 moves the capping heads 36 and container assemblies around the turret through the magnetic field produced by the coil. The magnetic field heats the outer portion of the foil membrane and the rolled edge of the foil liner to melt the heat seal resin on one or both as the container is rotated about its axis.

After a container assembly has been rotated through the magnetic field, the capping head 36 is raised off the container assembly which then exits the turret via star wheel 52. As seen in FIG. 3, the coil 40 stops short of the exit star wheel 52 so the capping heads 36 preferably maintain top pressure on the container assembly for a short interval after the assembly exits the magnetic field produced by the coil. In that short interval the foil membrane will cool sufficiently to permit release of the top pressure without losing the seal. This is possible because only the edge portions of the foil membrane and liner have been heated, and will therefore cool quickly. If the entire membrane were heated, considerably more time would be required to cool the membrane and resin, and premature release of the top pressure on the container before cooling could adversely affect the seal. This invention facilitates rapid heating and cooling and therefore requires that the top pressure be held for only a very short interval after removal of the container assembly from the magnetic field since only that portion in the magnetic field is subject to heating.

In a preferred mode of operation, the turret 32 may include 8 or more heads and may be rotated at 50 or more revolutions per minute to heat seal 400 or more containers per minute. In such operation, the container-closure assembly is in the magnetic field portion of the cycle for approximately one-half second and is rotated approximately 2¼ turns about its vertical axis. This means that, during such rotation, each increment of the peripheral edge of the foil membrane is moved into and out of the magnetic field twice. Typically the edge is heated and sealed progressively around the container, and any point on the edge is in the field less than approximately 0.1 second.

The power on the generator 46 is set at a relatively high level to produce a strong magnetic field which will quickly heat the edge of the foil membrane as required for proper seal. This will melt the heat seal resin on the membrane or container liner so it can flow into and around any irregularities in the container sealing surface.

Load to produce seal pressure is applied on each container by the downward force of the capping head against the container as supported by the container support. Springs in the container support control the amount of pressure applied against the container and compensate for differences in container heights. It is desirable to minimize the load applied to the containers so as to avoid crushing or damaging them. This invention makes it possible to employ a relatively light load on the containers by heating the sealing surfaces to a relatively high temperature to melt the heat seal resin so it will flow into and around humps or crevices in the sealing surface even without a high sealing pressure.

While a particular embodiment of this invention and mode of operation have been illustrated and described, it will be apparent to those skilled in the art that various changes and modifications can be made without departing from the scope of the invention and the claims appended hereto. For example, this invention can be used to seal glass and plastic containers as well as composite containers as in the mode selected for illustration.

What is claimed is:

1. A method of induction heat sealing metal closures on containers comprising:
   providing unsealed container-closure assemblies each of which includes a container having an open end with an upwardly facing sealing surface therearound and a metal closure member spanning the open end of the container and disposed against the sealing surface and with at least one of said closure member and said sealing surface having a heat seal resin thereon;
   feeding the unsealed container-closure assemblies into a sealing machine comprising a rotating turret having a plurality of spindles therein with each spindle having a non-metal rotating head thereon for engaging the closure member on an underlying container supported by a resilient support means and rotating the container-closure assembly about the vertical axis of the container as the assembly is rotated about the axis of the turret, said sealing machine having an induction heating coil disposed at least partway around the turret closely adjacent to the rotating heads to provide a magnetic field in the area of the heads;
   engaging the non-metal head against the top of the closure assembly to press the metal closure member against the sealing surface on the container and precisely position the contact area between the closure and the sealing surface of the container as it rotates through the magnetic field;
   rotating the container-closure assemblies through the magnetic field to heat the closure member at its contact with the container sealing surface and heat said resin while minimizing heating of said member beyond such area of contact; and
   removing the container-closure assemblies from the magnetic field to cool the heat seal resin and seal each closure member to its container.

2. A method as set forth in claim 1 in which the container-closure assembly seal area is in the magnetic field for approximately one-half second.

3. A method as set forth in claim 1 in which the container-closure assemblies are rotated approximately 2¼ about the container axis while in the magnetic field portion of the cycle.

4. A method as set forth in claim 1 in which 400–700 containers are sealed per minute.

5. A method of induction heat sealing metal foil membranes on composite containers comprising:
   providing unsealed container-closure assemblies each of which includes a composite container having a metal foil lining therein which is rolled outwardly on one end of the container to provide a rolled metal edge, a non-metal cap on said one end of the container, and a metal foil membrane in the cap disposed against an upwardly facing portion of the rolled edge of the container, and with at least one of said membrane and said edge having a heat seal resin thereon;
   feeding said unsealed container-closure assemblies into a sealing machine comprising a rotating turret having a plurality of spindles therein with each spindle having a non-metal rotating head thereon for pressing a closure against an underlying container supported by a resilient support means and rotating the container-closure assembly about the axis of the container as the container-closure assembly is rotated about the axis of the turret, said sealing machine having an induction heating coil disposed at least partway around said turret closely adjacent to said rotating heads to provide a magnetic field adjacent the heads;
   engaging the non-metal head against the cap to press the foil membrane in the cap against the sealing surface on the container and to precisely position the contact area between the closure and the upwardly facing portion of the rolled edge of the container as it rotates through the magnetic field;
   rotating the container-closure assemblies through said magnetic field to heat the periphery of said metallic membrane and rolled edge to the temperature required to soften said resin at the area of contact while minimizing heating of the membrane and liner beyond such area of contact; and
   removing the container-closure assemblies from the magnetic field to cool the heat seal resin and seal the membrane to the rolled edge of the container.

6. Apparatus for induction heat sealing metal closures to an upwardly facing edge of a container sidewall comprising:

a vertical axis rotating turret having a plurality of spindles therein with each spindle having a non-metal rotating head on it for pressing a closure member against an underlying container and rotating the container-closure assembly about the vertical axis of the container as the assembly is rotated about the axis of the turret;

a rotatable resilient container support under each spindle; and an induction heating coil disposed partway around the turret closely adjacent the rotating heads to produce a magnetic field in the area of the heads.

7. Apparatus as set forth in claim 6 in which said container supports are mounted on compression springs to resiliently support the container-closure assemblies during sealing.

* * * * *